United States Patent Office 3,813,357
Patented May 28, 1974

3,813,357
HYDROCARBON-DERIVED RESINS HAVING LOW SOFTENING POINT
David R. St. Cyr, Uniontown, Ohio, assignor to The Goodyear Tire & Rubber Company, Akron, Ohio
No Drawing. Continuation-in-part of application Ser. No. 52,133, July 2, 1970, now Patent No. 3,692,756. This application June 8, 1972, Ser. No. 260,881
Int. Cl. C08f 15/40
U.S. Cl. 260—5
3 Claims

ABSTRACT OF THE DISCLOSURE

A composition comprising a hydrocarbon-derived resin as a tackifier and a polymer selected from natural rubber, synthetic rubber and a thermo plastic polymer. The hydrocarbon-derived resin is characterized by having a softening point in the range of about 25° C. to about 80° C., a volatility of less than about 6 weight percent and a number average molecular weight in the range of about 1000 to about 1400 and which comprises from about 5 to about 60 percent units derived from piperylene, from about 1 to about 30 percent units derived from 1,3-butadiene, from about 5 to about 60 percent units derived from isobutylene, from about 5 to about 30 percent units derived from 2-methyl-1-butene, from about 5 to about 40 percent units derived from 2-methyl-2-butene, from about 0 to about 10 percent units derived from isoprene and from about 0 to about 10 percent units derived from other hydrocarbons containing 4 to 6 carbon atoms, wherein the ratio of units derived from piperylene to units derived from 1,3-butadiene is from about 10:1 to about 1:2 and the ratio of units derived from piperylene to units derived from isobutylene is from about 6:1 to about 1:6.

---

This application is a continuation-in-part of S.N. 52,133, filed July 2, 1970, now U.S. Pat. No. 3,692,756.

This invention relates to synthetic resins and a method of preparing such resins.

Hydrocarbon-derived resins having low softening points of from about 25° C. to about 80° C. are typically made by either polymerizing selected hydrocarbon mixtures to form low molecular weight resins or by mixing low molecular weight oils with high softening point resins. Typically, the selected hydrocarbon mixtures are polymerized with Friedel-Crafts catalysts to form resins having low molecular weights in the range of about 300 to about 800 or an oil having a low molecular weight in the range of about 300 to about 500 is mixed with a resin having a high softening point of about 90° C. to about 120° C. and a molecular weight in the range of about 1200 to about 2000 to prepare the low softening point resins.

Hydrocarbon-derived resins having low molecular weights and low softening points are typically accompanied with too high a volatility and thus unsuitable as tackifiers for most polymers. Volatility is detrimental to applications or resins in areas of heat exposure.

The mixing of a low molecular weigth oil with a high softening point resin having good tackifying properties is gerenally disadvantageous since it typically dilutes and thus reduces the tackifying properties of the resin and also greatly increases its volatility due to the low molecular weight oil being present, rendering its unsuitable for many commercial applications.

Therefore, is is an object of this invention to provide hydrocarbon-derived resins having low softening points while maintaining good tackifying properties, moderate molecular weights and low volatility.

It is known that, in the presence of Friedel-Crafts type of catalysts, piperyline typically produces polymers which have little or no commercial value because their physical properties render them generally unsuitable for use in commercial appllications. Isobutylene typically polymerizes with such catalysts at about 20° C. to about 30° C. only very slowly to ultimately produce rubbery polymers, although it can be polymerized under more stringent conditions to give a resin with a molecular weight in the range of 300 to 1900, a softening point of less than about 50° C., but generally with too high a volatility. With such catalysts 1,3-butadiene typically produces low molecular weight gummy materials. Attempting to polymerize 2-methyl-1-butene, 2-methyl-2-butene or 3-methyl-1-butene with Friedel-Crafts catalysts has typically resulted in no polymer at all, or at the most, low molecular weight oily products.

Thus, it is a further object of this invention to provide new and useful resinous polymers having tackifying properties comprising units derived primarily from piperylene, 1,3-butadiene, isobutylene, 2-methyl-1-butene, 2-methyl-2-butene and isoprene. It is an additional object to provide a method of preparing such resinous polymers.

In the practice of this invention, the term "piperylene" is used to refer to a mixture of cis-1,3 and trans-1,3 pentadienes typically containing from about 30 to about 70 weight percent trans-1,3-pentadiene, and correspondingly, about 70 to about 30 weight percent cis-1,3-pentadiene.

In practice, this invention is desirably accomplished by selectively mixing and polymerizing varying portions of at least two hydrocarbon mixtures, hereinafter identified as Mixture A and Mixture B. By suitable choice of proportions of these mixtures, the required hydrocarbon-derived resins are produced having low softening points according to ASTM Test E28–58T in the range of from about 25° C. to about 80° C., a low volatility of less than about 6 weight percent, and relatively high molecular weight of a number average in the range of from about 1000 to about 1400 while still maintaining good tackifying properties.

It was discovered that it is a characterization of this method that the resin softening point is substantially directly proportional to the weight ratio of Mixtures A and B when the compositions of each of the said mixtures is held substantially constant. This substantially straight line relationship was observed when Mixture A was in the range of about 25 to about 85 weight percent and Mixture B was in the range of about 15 to about 75 weight percent of the total monomer mixture.

For the accomplishment of this invention, hydrocarbon Mixture A comprises from about 25 to about 60 weight percent of isobutylene, from about 5 to about 30 weight percent 1,3-butadiene, from about 5 to about 35 weight percent 2-methyl-2-butene, from about 0 to about 10 weight percent isoprene, and from about 0 to about 15 weight percent of other hydrocarbons containing from 4 to 5 carbon atoms.

For this invention, Mixture B comprises from about 20 to about 50 weight percent 2-methyl-2-butene, from about 20 to about 60 weight percent piperylene, from about 2 to about 20 weight percent 4-methyl-2-pentene, from about 0 to about 5 weight percent isoprene, from about 0 to about 15 weight percent of other hydrocarbons containing 5 to 6 carbon atoms and form about 0 to 10 weight percent of dimers and codimers of unsaturated hydrocarbons containing 5 to 6 carbon atoms having boiling points above 70° C.

The resins of this invention have the composition and structure of resins which comprise from about 25 to about 85 percent units derived from hydrocarbon Mixture A and from about 15 to about 75 percent units derived from hydrocarbon Mixture B. They are useful as tackifiers and extenders for natural rubber and various synthetic rubbers. The resins are typically characterized by having a volatility of from about 1 to about 6 weight percent as measured by oven aging for 5 hours at 350° F. or 177° C. when the resins are recovered and finished by vacuum distillation. If the resins are finished by steam stripping, they typically have a volatility of from about 1 to about 3 weight percent.

Thus, according to this invention, it has been discovered that a resinous polymer useful as a tackifier and having a softening point of from about 25° C. to about 80° C., a molecular weight of about 1000 to about 1400 and a volatility of from about 1 to about 6 weight percent, comprises from about 5 to about 60 percent units derived from piperylene, from about 1 to about 20 percent units derived from 1,3-butadiene, from about 5 to about 60 percent units derived from isobutylene, from about 5 to about 30 percent units derived from 2-methyl-1-butene, from about 5 to about 40 percent units derived from 2-methyl-2-butene, about zero to about 10 percent units derived from isoprene, and from about zero to about 10 percent units derived from other hydrocarbons containing 4 to 6 carbon atoms, wherein the ratio of units derived from piperylene to units derived from 1,3-butadiene is from about 10:1 to about 1:2 and the ratio of units derived from piperylene to units derived from isobutylene is from about 6:1 to about 1:6. Thus, controlled mixtures of unsaturated hydrocarbons containing 4 to 6 carbon atoms which, on an individual basis, typically produce products with comparatively limited commercial value, are subjected to polymerization conditions to produce low softening point resinous polymers having low volatility and useful tackifying properties.

In the practice of this invention, the resinous polymer is prepared by subjecting to polymerization in the presence of an anhydrous catalyst selected from aluminum chloride and ethyl-aluminum dichloride, a mixture comprising from about 20 to about 60 weight percent piperylene, from about 5 to about 30 weight percent 1,3-butadiene, from about 25 to about 75 weight percent isobutylene, from about five to about 30 weight percent 2-methyl-2-butene, from about 20 to about 50 weight percent 2-methyl-2-butene, from about zero to about 15 weight percent 3-methyl-1-butene, from about 0 to about 10 weight percent isoprene, and from about zero to about 15 weight percent of other hydrocarbons having 4 to 6 carbon atoms.

In carrying out the polymerization, the mixture of monomers can be contacted with the catalyst by various means. The catalyst may be added to the monomer mixture or the monomer mixture may be added to the catalyst. If desired, the catalyst and mixture of monomers may be added simultaneously or intermittently to a reactor. The reaction can be conducted continuously or by batch process techniques generally known to those skilled in the art. When a particulate catalyst is used typically it has a particle size in the range of from about 5 to about 200 U.S. Standard mesh size, although larger or smaller particles can be used. Although the amount of catalyst is not critical, a sufficient amount of catalyst is used to cause a polymerization reaction to occur.

The reaction is conveniently carried out in the presence of a diluent because it is usually exothermic. However, with adequate mixing and cooling, the temperature can be controlled and the reaction conducted without a diluent. Various diluents which are inert in that they do not enter into the polymerization may be used. Representative examples are aliphatic hydrocarbons such as pentane, hexane and heptane, dichloromethane, aromatic hydrocarbons, such as toluene, benzene and unreacted residual hydrocarbons from the reaction.

A wide range of temperatures can be used for the polymerization reaction. The polymerization can be carried out at temperatures in the range of from about —30° C. to about 100° C., although usually the reaction is carried out at a temperature in the range of from about —20° C. to about 50° C. The polymerization reaction pressure is not critical and may be atmospheric or above or below atmospheric pressure. Generally, a satisfactory polymerization can be conducted when the reaction is carried out at about autogenous pressure developed by the reactor under the operating conditions used. The time of the reaction is not generally critical and reaction times can vary from a few seconds to 12 hours or more.

The resinous compositions of this invention are generally soluble in aliphatic hydrocarbons such as pentane, hexane and heptane and aromatic hydrocarbons such as benzene and toluene. They are generally useful as modifiers for natural rubber and various synthetic rubbers. They are particularly useful in hot melts.

The following examples further illustrate the invention and are not intended to be limiting. In these examples, parts and percentages are by weight unless otherwise indicated.

EXAMPLE I

Two streams (A and B) having the following compositions were blended to give a monomer mixture consisting of 50 parts of Stream A and 50 parts of Stream B.

STREAM A

| Compound: | Percent |
|---|---|
| Isobutylene | 30.5 |
| trans-2-butene | 3.8 |
| cis-2-butene | 3.6 |
| 1,3-butadiene | 15.1 |
| 3-methyl-1-butene | 8.8 |
| 2-methyl-1-butene | 25.9 |
| Isoprene | 4.5 |
| 1-pentene | 5.1 |
| Other hydrocarbons having 4 to 5 carbon atoms | 2.7 |

STREAM B

| Compound: | Percent |
|---|---|
| 2-methyl-2-butene | 35.2 |
| 4-methyl-2-pentene | 7.7 |
| Piperylenes | 39.8 |
| Isoprene and cyclopentene | 6.6 |
| Other hydrocarbons having 5 to 6 carbon atoms | 10.7 |

Into a reactor purged with nitrogen and fitted with a stirrer, dry ice jacketed addition funnel, condenser, dry ice cold finger, and nitrogen purging system, was placed 600 parts of dichloromethane and 44 parts of anhydrous particulate aluminum chloride. The mixture was adjusted to a temperature of about —8° C. to —12° C. To the reaction was slowly charged 2420 parts of the hydrocarbon mixture containing 1210 parts of Stream A and 1210 parts of Stream B over a period of about 4½ hours. After addition, the mixture was stirred for an additional ½ hour. The resulting mixture was filtered through a Celite-asbestos filter bed and then distilled to a pot temperature of about 200° C. under a nitrogen atmosphere. Steam at 250° C. was added and the pot temperature allowed to go to 235° C. The pot temperature was held at 235° C. until the water to oil ratio in the distillate was 20 to 1. The hot resin was poured into aluminum pans to cool. The yield was 68.2 percent of an opaque yellow resinous material having a softening point of about 53° C. according to ASTM Method E28–58T. The resin had an average molecular weight of 1110, as determined by vapor pressure osmometry. A sample of the resin was heated for 5 hours at 350° F. or 177° C., in an air circulating oven with a resultant weight loss of 1.87 percent, thus exhibiting a volatility of only 2 weight percent.

A material balance around the reaction system indicated the resulting resinous material to have the following composition:

| Compound: | Percent |
| --- | --- |
| Isobutylene | 18.7 |
| 1,3-butadiene | 7.3 |
| Isoprene | 4.7 |
| 2-methyl-1-butene | 15.7 |
| 2-methyl-2-butene | 19.0 |
| Piperylene | 26.7 |
| Other hydrocarbons having 4 to 6 carbon atoms | 7.9 |

EXAMPLE II

The two streams (A and B) used in Example I were blended to give a monomer mixture consisting of 30% Stream A and 70% Stream B. The equipment and reaction procedure used was the same as in Example I. The monomer mixture consisted of 660 parts of Stream A and 1540 parts of Stream B. After distillation, the yield was 71.1 percent of an opaque yellow resinous material having a softening point of about 72° C. and an average molecular weight of 1130. A sample of the resin was heated for 5 hours at 350° F. or 177° C. in an air circulating oven with a resultant weight loss of 1.78 percent (a volatility of less than 2 percent). A material balance around the reaction system indicates the resulting resinous material to have the following composition:

| Compound: | Percent |
| --- | --- |
| Isobutylene | 11.0 |
| 1,3-butadiene | 4.3 |
| Isoprene | 4.0 |
| 2-methyl-1-butene | 9.3 |
| 2-methyl-2-butene | 26.9 |
| Piperylene | 36.4 |
| Other hydrocarbons having 4 to 6 carbon atoms | 8.1 |

EXAMPLE III

Two streams (A and B) having the following compositions were blended to give a monomer mixture consisting of 75 parts of Stream A and 25 parts of Stream B.

STREAM A

| Compound: | Percent |
| --- | --- |
| Isobutylene | 45.0 |
| Trans-2-butene | 3.2 |
| Cis-2-butene | 2.3 |
| 1,3-butadiene | 12.7 |
| 2-methyl-1-butene | 22.5 |
| 3-methyl-1-butene | 8.2 |
| Other hydrocarbons having from 4 to 5 carbon atoms | 6.1 |

STREAM B

| Compound: | Percent |
| --- | --- |
| 2-methyl-2-butene | 42.5 |
| Trans piperylene +/or 4-methyl-cis-2-pentene | 26.9 |
| Trans piperylene +/or 4-methyl-cis-2-pentene | 26.9 |
| 4-methyl-trans-2 pentene | 16.5 |
| Other hydrocarbons with boiling points above 70° C. | 8.0 |
| Other hydrocarbons with from 5 to 6 carbon atoms | 6.1 |

Into a reactor, purged with nitrogen and fitted with a stirrer, dry ice jacketed dripping funnel, condenser, dry ice cold finger, and nitrogen purge system, was placed 100 parts of dichloromethane and 8 parts of anhydrous particulate aluminum chloride. The mixture was adjusted to a temperature of about −5° C. to −15° C. To the reactor was slowly charged 400 parts of a hydrocarbon monomer mixture made up of 300 parts of Stream A and 100 parts of Stream B over a period of about 1 hour. After the addition, the mixture was stirred for another hour. Then 15.8 parts of isopropanol and 10 parts of water was added to deactivate the catalyst. The resulting mixture was filtered through an asbestos-Celite filter bed and then distilled to a pot temperature of about 250° C. at a reduuced pressure of about 10 millimeters of mercury. The hot resin in the pot was poured onto a glass surface and cooled to about 25° C. to form a yield of 58 percent of an opaque yellow resinous material having a softening point of about 25° C. according to ASTM Method E28–58T. The resin had a molecular weight of 1080 as determined by vapor pressure osmometry. After heat again in an air circulating oven for 5 hours at 350° F. the resultant weight loss was 4.02 percent.

EXAMPLE IV

The two streams (A and B) used in Example III were blended to give a monomer mixture of 50 percent Stream A and 50 percent Stream B. The equipment and reaction procedure used was the same as in Example III. The monomer mixture consisted fo 200 parts Stream A and 200 parts Stream B. After distillation the yield was 51% of an opaque yellow resinous material having a softening point of 47° C. and a molecular weight of 1090. A sample of the resin was heated for 5 hours at 350° F. in an air circulating oven with a resultant weight loss of 5.03 percent.

Example V

The two streams (A and B) used in Example III were blended to give a monomer mixture of 25 percent Stream A and 75 percent Stream B. The equipment and reaction procedure used was the same as in Example III. The monomer mixture consisted of 100 parts of Stream A and 300 parts of Stream B. After distillation, the resinous material had a softening point of about 68° C. and a molecular weight of 1070. A sample of the resin was heated for 5 hours at 350° F. in an air circulating oven with a resultant weight loss of 4.4%.

The softening points of the resins prepared in Examples III, IV and V, when plotted versus the ratio of Streams A and B, demonstrate the substantially direct relationship therebetween by the relatively straight line. The softening points are in the range of 25° C. and 68° C. and the ratio of A to B ranges from 75:25 to 25:75. Certainly, it should also be observed that the volatility ranges from 2% to 5% and the average molecular weight was in the narrow range of 1070 to 1090.

The resins required in this invention and as specifically exemplified in these examples are suitable tackifiers for various polymers such as natural and synthetic rubber, and such compositions comprise from about 5 to about 50 parts by weight of the resin per 100 parts by weight of polymer. The compositions are suitable as pressure sensitive adhesives, particularly with the higher resin loadings. Representative of various synthetic rubbers are rubbery polymers of conjugated dienes including polybutadiene, polyisoprene, copolymers of butadiene and isoprene which contain a major portion of butadiene, particularly copolymers of butadiene and styrene of the hot and cold SBR type which contain from about 60 to about 80 percent by weight of butadiene, copolymers of butadiene and acrylonitrile, butyl rubber, which is a polymerization product of a major portion of a monoolefin such as isobutylene and a minor portion of a diolefin, such as butadiene or isoprene, copolymers of ethylene and propylene and terpolymers of ethylene, propylene and a diene.

The resins required by this invention and as specifically exemplified in the examples are suitable as tackifiers in hot melt compositions. Such hot melt compositions comprise from about 15 to about 40 parts by weight of the resin per 100 parts by weight of at least one thermoplastic polymer selected from the group consisting of polyethylene having a molecular weight of from about 1500 to about 21,000, atactic polypropylene, polybutene and ethylene-vinyl acetate copolymers.

Thus, the resins of this invention are particularly suitable as tackifiers for polymers selected from natural rubber, synthetic rubber and thermoplastic polymers in order to substantially enhance their usefulness by adding tack where such polymers may otherwise be deficient.

While certain representative embodiments and details have been shown for the purpose of illustrating the invention, it will be apparent to those skilled in this art that various changes and modifications may be made therein without departing from the spirit or scope of the invention.

What is claimed is:

1. A composition comprising a hydrocarbon-derived resin as a tackifier and at least one polymer selected from natural rubber, a thermoplastic polymer and synthetic rubber selected from polybutadiene, polyisoprene, copolymers of butadiene and isoprene, copolymers of butadiene and acrylonitrile, butyl rubber, copolymers of ethylene and propylene and rubber terpolymers of ethylene, propylene and a diene, where said resin is present in an amount of about 5 to about 50 parts by weight per 100 parts by weight of said natural and synthetic rubber and is present in an amount of about 15 to about 40 parts by weight per 100 parts by weight of said thermoplastic polymer, where said thermoplastic polymer is selected from the group consisting of polyethylene having a molecular weight of about 1500 to about 21,000, atactic polypropylene, polybutene, and ethylene-vinyl acetate copolymers and where said hydrocarbon-derived resin is characterized by having a softening point in the range of about 25° C. to about 80° C., a volatility of less than about 6 weight percent and a number average molecular weight in the range of about 1000 to about 1400 which comprises from about 5 to about 60 percent units derived from piperylene, from about 1 to about 30 percent units derived from 1,3-butadiene, from about 5 to about 60 percent units derived from isobutylene, from about 5 to about 30 percent units derived from 2-methyl-1-butene, from about 5 to about 40 percent units derived from 2-methyl-2-butene, from about 0 to about 10 percent units derived from isoprene and from about 0 to about 10 percent units derived from other hydrocarbons containing 4 to 6 carbon atoms, wherein the ratio of units derived from piperylene to units derived from 1,3-butadiene is from about 10:1 to about 1:2 and the ratio of units derived from piperylene to units derived from isobutylene is from about 6:1 to about 1:6 prepared by the method which comprises polymerizing a hydrocarbon mixture of the composition prepared by mixing from about 25 to about 85 weight percent of Mixture A with from about 15 to about 75 weight percent of Mixture B, at a temperature of from about −20° C. to about 50° C., in the presence of an anhydrous catalyst selected from aluminum chloride and ethylaluminum dichloride wherein it is a characterization of the said method that the resin softening point is substantially directly proportional to the weight ratio of Mixtures A and B when the compositions of each of the said Mixtures is held substantially constant where Mixture A comprises from about 25 to about 60 weight percent isobutylene, from about 5 to about 35 weight percent 2-methyl-1-butene, from about 0 to about 10 weight percent isoprene, and from about 0 to about 15 weight percent of other hydrocarbons containing 4 to 5 carbon atoms, and where Mixture B comprises from about 20 to about 50 weight percent 2-methyl-2-butene, from about 20 to about 60 weight percent piperylene, from about 0 to 5 weight percent isoprene, from about 0 to 15 weight percent of other hydrocarbons containing 5 to 6 carbon atoms and from about 0 to 10 weight percent of dimers and codimers of unsaturated hydrocarbons containing 5 to 6 carbon atoms having boiling points above 70° C.

2. The composition according to claim 1 where the polymer is a synthetic rubber selected from polybutadiene, polyisoprene, copolymers of butadiene and isoprene, copolymers of butadiene and acrylonitrile, butyl rubber, copolymers of ethylene and propylene and rubbery terpolymers of ethylene, propylene and a diene.

3. The composition according to claim 1 where the polymer is a thermoplastic polymer selected from the group consisting of polyethylene having a molecular weight of about 1500 to about 21,000, atactic polypropylene, polybutene and ethylene-vinyl acetate copolymers.

References Cited
UNITED STATES PATENTS

| | | | |
|---|---|---|---|
| 3,692,756 | 9/1972 | St. Cyr | 260—80.7 |
| 3,509,239 | 4/1970 | Tindall | 260—80.7 |
| 3,541,188 | 11/1970 | Srail | 260—82 |
| 3,444,259 | 5/1969 | Ilnyskyj | 260—80.7 |
| 3,478,005 | 11/1969 | Wheeler | 260—80.7 |
| 3,467,632 | 9/1969 | Davis | 260—80.7 |
| 2,523,150 | 9/1950 | Schneider | 260—82 |

JOHN C. BLEUTGE, Primary Examiner

U.S. Cl. X.R.

260—80.7, 82, 888, 889, 894, 897 A